United States Patent [19]
Botz et al.

[11] Patent Number: 5,182,422
[45] Date of Patent: Jan. 26, 1993

[54] ELECTRIC SWITCH, ESPECIALLY FOR OPERATING A WINDSHIELD WIPER AND WASHER SYSTEM OF A MOTOR VEHICLE

[75] Inventors: Jakob Botz, Ingersheim; Georg Hofmann, Heilbronn-Horkheim; Adam Weber, Bietigheim-Bissingen, all of Fed. Rep. of Germany

[73] Assignee: SWF Auto-Electric, Bietigheim-Bissengen, Fed. Rep. of Germany

[21] Appl. No.: 706,455

[22] Filed: May 28, 1991

[30] Foreign Application Priority Data

May 25, 1990 [DE] Fed. Rep. of Germany ....... 4016773

[51] Int. Cl.$^5$ .............................................. H01H 9/00
[52] U.S. Cl. ..................... 200/61.54; 200/4; 200/61.27
[58] Field of Search ........... 200/4, 61.27, 61.3, 200/61.31, 61.34, 61.35, 61.54

[56] References Cited

U.S. PATENT DOCUMENTS

| | | | |
|---|---|---|---|
| 3,892,932 | 7/1975 | Erdelitsch et al. | 200/61.27 |
| 4,238,650 | 12/1980 | Cryer et al. | 200/4 |
| 4,273,971 | 6/1981 | Tregurtha | 200/4 |
| 4,293,743 | 10/1981 | Iwata et al. | 200/4 |
| 4,376,236 | 3/1983 | Long et al. | 200/61.27 |
| 4,376,237 | 3/1983 | Long | 200/61.27 |
| 4,678,875 | 7/1987 | Erdelitsch et al. | 200/61.54 |
| 4,791,253 | 12/1988 | Erdelitsch et al. | 200/61.27 |
| 4,810,839 | 3/1989 | Chretien | 200/4 |

*Primary Examiner*—J. R. Scott
*Attorney, Agent, or Firm*—Robert P. Seitter; J. Gordon Lewis

[57] ABSTRACT

An electric switch for operating a windshield wiper and washer system of a motor vehicle. In a switch housing a switching member is swivellably mounted around a first axis between several switching positions. A switch lever which is swivellably mounted on the switching member around a second axis which preferably perpendicularly intersects the first axis. An electric contact is movable by swiveling the switch lever around the second axis. To manufacture the electric switch at low cost and to promote a long lifetime for the two stationary contacts acted upon by the electric contact, the electric contact is held on the switch lever and acts upon the two stationary contacts at different points in at least two different switching positions of the switching member when swiveling the switch lever relative to the switching member.

13 Claims, 5 Drawing Sheets

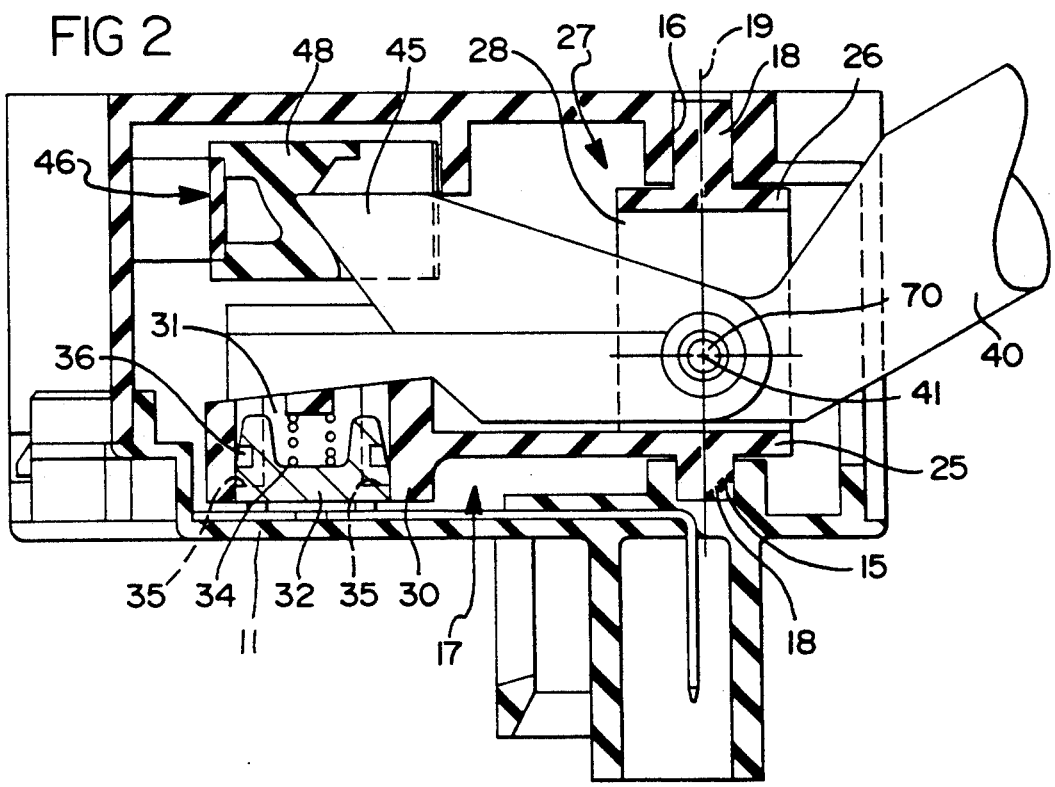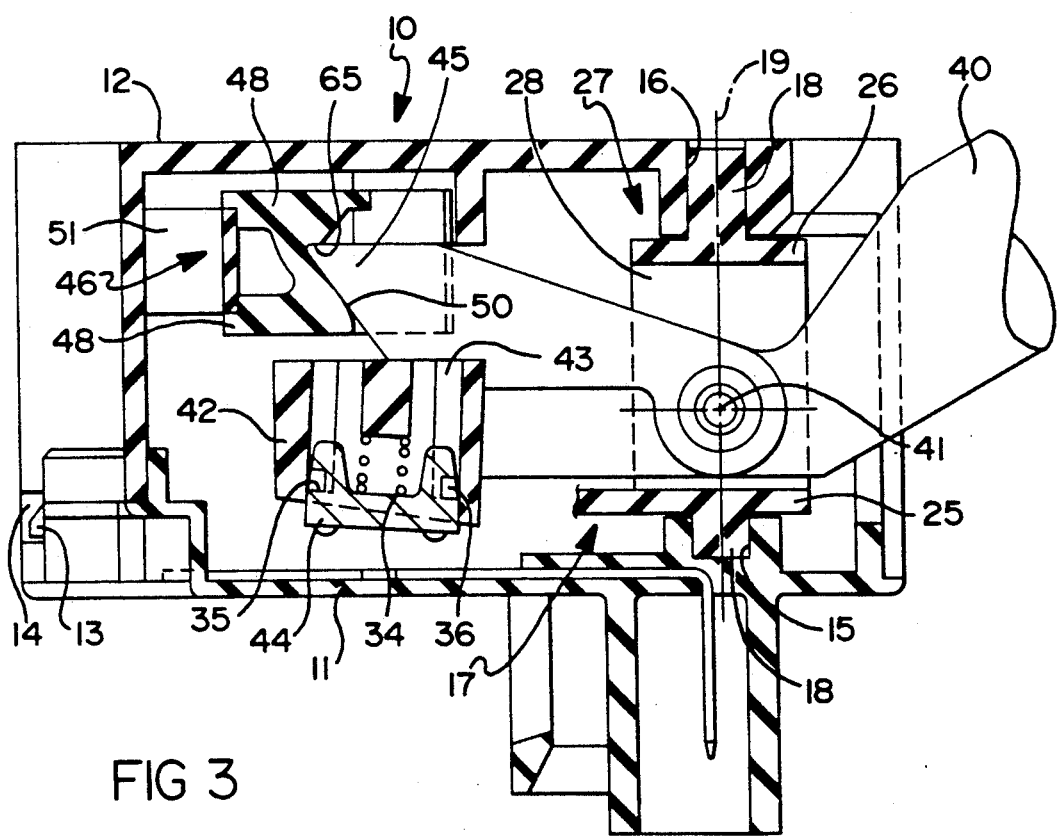

ELECTRIC SWITCH, ESPECIALLY FOR OPERATING A WINDSHIELD WIPER AND WASHER SYSTEM OF A MOTOR VEHICLE

INTRODUCTION

The present invention relates to an electric switch which is used especially for operating a windshield wiper and washer system of a motor vehicle.

BACKGROUND OF THE INVENTION

Electric switches for operating a windshield wiper and washer system of a motor vehicle are known. In such electronic switches the different operational stages windshield wiper system can be switched on by swiveling the switching member mounted in the switch housing around a first axis from a neutral position into one of several operational positions by the switch lever. The neutral position and the operational positions of the switching member are combined under the generic term "switching positions".

In each of the switching positions of the switching member and of the switch lever, defined with respect to the first axis, the switch lever, can be swiveled with respect to the switching member around a second axis so that the windshield washer system of the motor vehicle is positioned to spray water onto the windshield. There are electric switches in which the switch lever, when swiveled around the second axis, directly acts upon a bridging contact movably held in the switch housing. Depending upon its position with respect to the first axis, the switch lever acts upon this bridging contact so that the switching conditions differ depending on the position of the switch lever. In other known electric switches an additional thrust piece which can be moved straight on is inserted between the switch lever and the movable bridging contact. The position of which thrust piece is not affected by swiveling the switch lever and the switching member around the first axis; the thrust piece acts upon the movable bridging contact in the same way each regardless of the position of the switch lever. However, as an additional component, the thrust piece increases manufacturing and assembling costs.

BRIEF DESCRIPTION OF THE INVENTION

The object of the present invention is to provide an electric switch which can be produced at low cost and for which the switching conditions, when swiveling around the second axis, are to a large extent independent of the position of the switching member and of the switch lever with respect to the first axis.

This object is achieved according to the present invention by an electric switch in which the electric contact is held on the switch lever and acts upon the same (two) stationary contacts at different points in at least two different switching positions of the switching member, when swiveling the switch lever relative to the switching member. In such an electric switch, no additional component between the switch lever and the electric contact is needed. The relative position between the switch lever and the electric contact is maintained when swiveling the switching member and the switch lever around the first axis because the electric contact is located directly on the switch lever. The position of the electric contact is only changed with respect to the two stationary contacts which are acted upon by it when swiveling the switch lever around the second axis. The additional advantage thereof is that the two stationary contacts are abraded at several contact points, by contact burning or the like, so that the lifetime of these two contacts is increased. The switch lever is swiveled around the second axis in different switching positions of the switching member so that, depending upon the switching position of the switching member, the electric contact acts upon the two stationary contacts at other points.

To turn on the windshield wiper system, the switching member usually carries at least a second electric contact. If the first and the second electric contact are about at the same distance from the first axis, around which the switching member can be swiveled, it is advantageous to locate those contacts one after the other in the swiveling direction the switch housing can be relatively short in the direction of the switch lever. To achieve small switching angles in the longitudinal direction of a preferred embodiment, a movable electric contact radially extends to the first axis. If a movable contact in a switching position nears a side wall of the switch housing, it is advantageous if, in this switching position, the movable contact is approximately parallel to the side wall of the switch housing. In this case, the extension of the switch housing in the direction of the second axis can be smaller than in a radial arrangement of the contact.

For purposes of construction it is advantageous if the switching member has a first frame-like section, which the switch lever passes through and in which the switch lever is mounted, and a second section protruding from the frame-like section. The second section carries a second electric contact. The first electric contact held on the switch lever is located outside the second section of the switching member. Thus, the first electric contact is not in an aperture of this second section. Then, when being assembled, the switch lever can be pushed through the frame-like section of the switching member. This need not be taken into consideration when forming the switch lever in the area of the first electric contact.

If the electric contact held on the switch lever is positioned far outside a plane which is perpendicular to the second axis and which the first axis intersects, tilting moments occurring on the switch lever when swiveling it around the second axis can be compensated especially well, if, viewed in the direction of the second axis, the frame-like section of the switching member is wider from the first axis towards the side on which the electric contact is situated on the switch lever than towards the other side. In this case, the switch lever is also still supported far outside the plane mentioned above so that the tilting moment is small.

If there is not much space in the direction of the second axis, the first contact carried by the switch lever and a second contact carried by the switching member, viewed in the radial direction of the first axis, are preferably arranged one after the other. Consequently, the radial direction is preferably perpendicular to the second axis.

Two embodiments of an electric switch according to the present invention are illustrated in the drawings. The invention is described in more detail below with reference to these drawings.

BRIEF DESCRIPTION OF THE DRAWINGS

FIG. 2 is the first embodiment shown in different cutting planes parallel to the first axis;

FIG. 3 is the first embodiment with an additional cutting plane parallel to the first axis;

DETAILED DESCRIPTION OF THE PREFERRED EMBODIMENTS OF THE INVENTION

Figure 1:
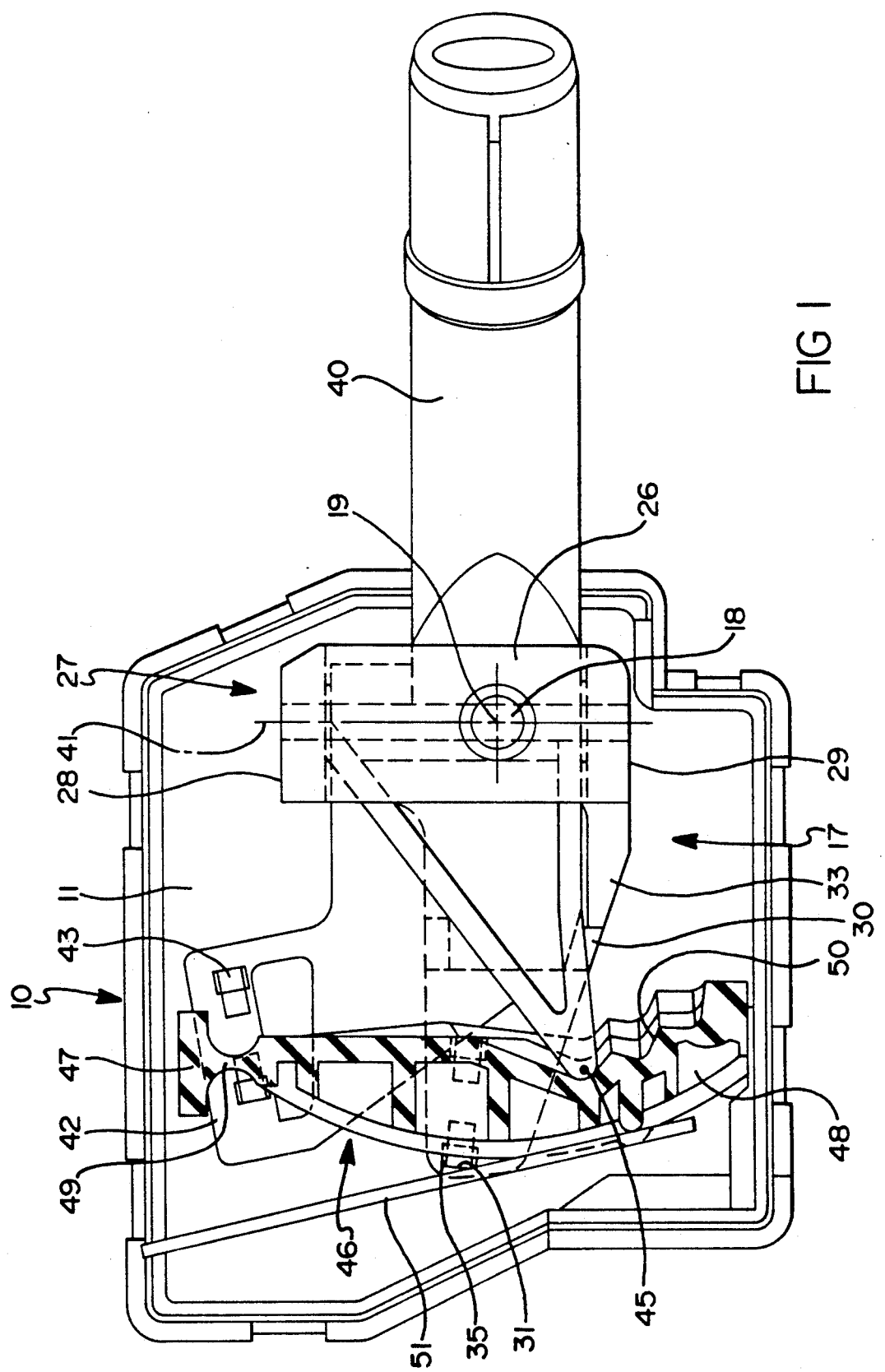
FIG. 1 is, in the direction of the swiveling axis of the switching member, a view of the open switch housing of the first embodiment.

A switch housing 10 of the electric switch according to the FIGS. 1 to 4 consists of a base plate 11 and a top 12 which are locked within each other by means of locking lugs 13 of the base plate 11 and by means of apertures 14 of the top 12. Base plate 11 and top 12 have aligning bearing bores 15 and 16 in which a switching member 17 with two bearing pins 18 is swivellably mounted around a first axis 19.

The two bearing pins 18 are located on two parallel sides 25 and 26 of a frame-like section 27 of the switching member 17. Section 27 is completed by two further side walls 28 and 29 perpendicular to the sides 25 and 26 and parallel to each other. A plate-like section 30 with a receiver 31 for a second bridging contact 32 is formed onto the side 25 of the frame-like section 27. FIG. 1 makes clear that the plate-like section 30 of the switching member 17 is fixedly bound onto the frame-like section 27 by a rib 33 extending off from the side wall 29 of the frame-like section 27 and steeply dropping from the side 26 of this section. The second bridging contact 32 is pushed against the base plate 11 by a helical spring 34. Shoulders 35 in the receiver 31 and projections 36 on the second bridging contact 32 secure this second bridging contact, however, against being completely pushed out of the receiver 31 by the helical spring 34 during the assembly.

In the frame-like section 27 of the switching member 17, a switch lever 40 (shown in the FIGS. without handle) is mounted in such a way that it can be swiveled around a second axis 41 perpendicular to the first axis 19 and intersecting this first axis 19. Within the switch housing 10, the switch lever 40 integrally comprises an extension 42 with a receiver 43. Extension 42 projects from the side wall 28 of the switching member 17 and is arranged laterally to the plate-like section 30 of the switching member 17. In receiver 43, first bridging contact 44 is supported by a helical spring 34 and is hung by shoulders 35 and projections 36 in the same way as the second bridging contact 32 in the receiver 31 of the switching member 17.

Figure 4:
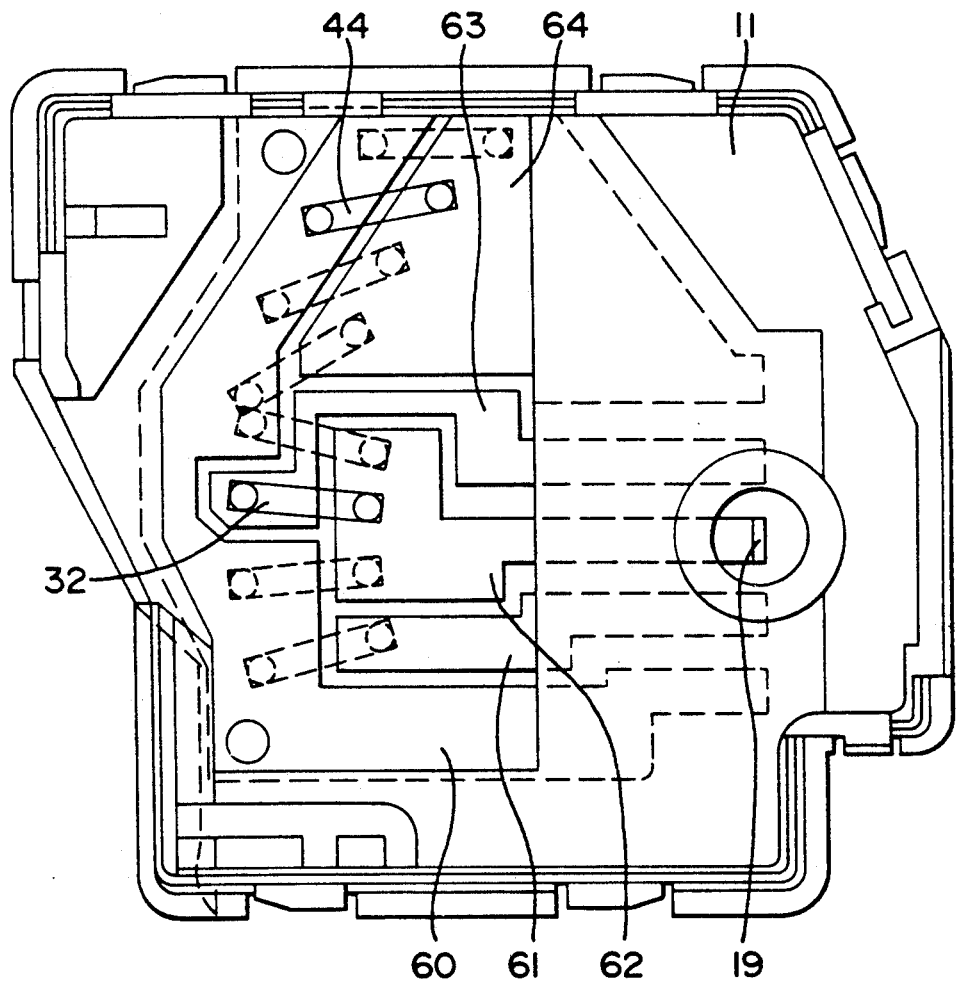
FIG. 4 is a view of the base plate of the first embodiment provided with stationary contact, whereby, when swiveling the switch lever and the switching member around the first axis, the different positions of the movable contacts are indicated.

Above the plate-like section 30 of the switching member 17, the switch lever 40 has a cam 45 which lies on a locking lever 46 one end 47 of locking lever 46 is fixed onto the top 12 of the switch housing (in a manner not illustrated, but known, for instance, from FIGS. 3 and 4 of U.S. Pat. No. 4,791,253). Locking lever 46 has a lever arm 48, which is linked with the end 47 via a film hinge 49, and a control member 50 for the cam 45 of the switching lever 40. Control member 50 determines the different switching positions of the switching member 17 and of the switch lever 40 with respect to the axis 19. At the back opposite the control member 50 the lever arm 48 is supported by a leaf spring 51 which is fixed in the top 12 of the.. switch housing 10 by one end in a manner shown in FIG. 3 of U.S. Pat. No. 4,791,253.

On the base plate 11 there are a total of five stationary contacts 60, 61, 62, 63 and 64, with which two bridging contacts 32 and 44 cooperate. The form and arrangement of the stationary contacts are made clear in FIG. 4. In FIG. 4, the bridging contacts 32 and 44 are indicated in continual lines in positions which they occupy, with respect to the axis 19, when the switching member 17 and the switch lever 40 are in a neutral position with respect to this axis 19. In that neutral position, typically the windshield wiper system is switched off. It can be seen that the longitudinal direction of the second bridging contact 32 is identical with a radial direction with respect to the first axis 19. If the switch lever 40 in the views of FIGS. 1 and 4 is swiveled clockwise around the axis 19, it brings along the switching member 17 and the second bridging contact 32, connecting the two stationary contacts 62 and 63 with each other in the neutral position of the switching member 17, changes into a position which is indicated in broken lines in FIG. 4 and in which the two stationary contacts 60 and 62 are connected with each other. If the switch is used for controlling a windshield wiper system of a motor vehicle, the motor of this windshield wiper system rotates at slow speed. The cam 45 of the switch lever 40 is shifted along the control member 50 in the direction of the film hinge 49 of the locking lever 46. If the switch lever 40 is released again, it and the switching member 17 return into the original position due to the form of the control member 50. Thus the described switching position of the switching member 17 and the switch lever 40 correspond to the tip-wiping.

When swiveling the switch lever 40 and the switching member 17 counter-clockwise out of the neutral position, the second bridging contact 32 also connects the two stationary contacts 60 and 62. However, upon release, the switch lever 40 does not return into the neutral position on its own. Thus this switching position corresponds to a continual operation of the windshield wiper system with low speed of the operating electric motor. If the switch lever 40 and the switching member 17 are further swiveled counter-clockwise, the second bridging contact 32 connects the two stationary contacts 60 and 61. Then the windshield wiper system is driven at a higher speed of the electric motor.

The swiveling movements of the switch lever 40 around the first axis 19 also affect the first bridging contact 44. The different positions occupied, with respect to the axis 19 by said bridging contact 44 are indicated in FIG. 4 in broken lines. In a position, which the switch lever 40 reaches from the neutral position by being swiveled clockwise, the first bridging contact 44 is arranged in its longitudinal direction parallel to the adjacent side wall of the base plate 11 so that the space provided in the switch housing 10 is used to best advantage.

FIG. 3 shows that the control member 50 is not parallel to the axis 19, but is sloping with respect to it in such a way that the distance between control member 50 and the axis 19 gets smaller towards the base plate 11. Therefore the control member tries to swivel the switch lever 40—according to FIGS. 2 and 3—clockwise to an extent each time that the 45 lies on a stop 65 of the locking lever 46 extending along the control member 50. If the switch lever 40 is not swiveled around the second axis 41 by outer forces, the cam 45 lies on the stop 65 and the first bridging contact 44 is, at it can be seen in FIG. 3, at a distance from the stationary contacts on the base plate 11. This applies to all switching positions of the switching member 17 and of the switch lever 40 with respect to the axis 19. If the switch lever 40 is swiveled around the axis 41 from the neutral position illustrated in FIGS. 2 and 3 counter-clockwise, the first bridging contact 44 acts upon the two stationary contacts 60 and 64. Thereby the contact points differ depending upon the switching position of the switching member 17. The contact between the two stationary contacts 60 and 64 starts a wiper washer system and sprays water onto the windshield of the motor vehicle. This is possible in each switching position of the switching member 17. When releasing the switch lever 40, switch lever 40 returns into its original position due to the sloping control member 50 and to the leaf spring 51.

The stationary contacts 60 and 64 are acted upon by the first bridging contact 44 far outside a plane perpendicular to the second axis 41 and intersecting the first axis 19. Therefore the frame-like section 27 of the switching member 17 is formed in such a way that it, viewed in the direction of the second axis 41, is longer from the first axis 19 towards the side of the plane mentioned above, on which the bridging contact is located, than towards the other side. Thus the bearing pin 70, which mounts the switch lever 40 in the two side walls 28 and 29 of the frame-like section 27 of the switching member 17, is still supported far outside so that no great tilting moments act upon the bearing points of the switch lever 40.

Figure 5:
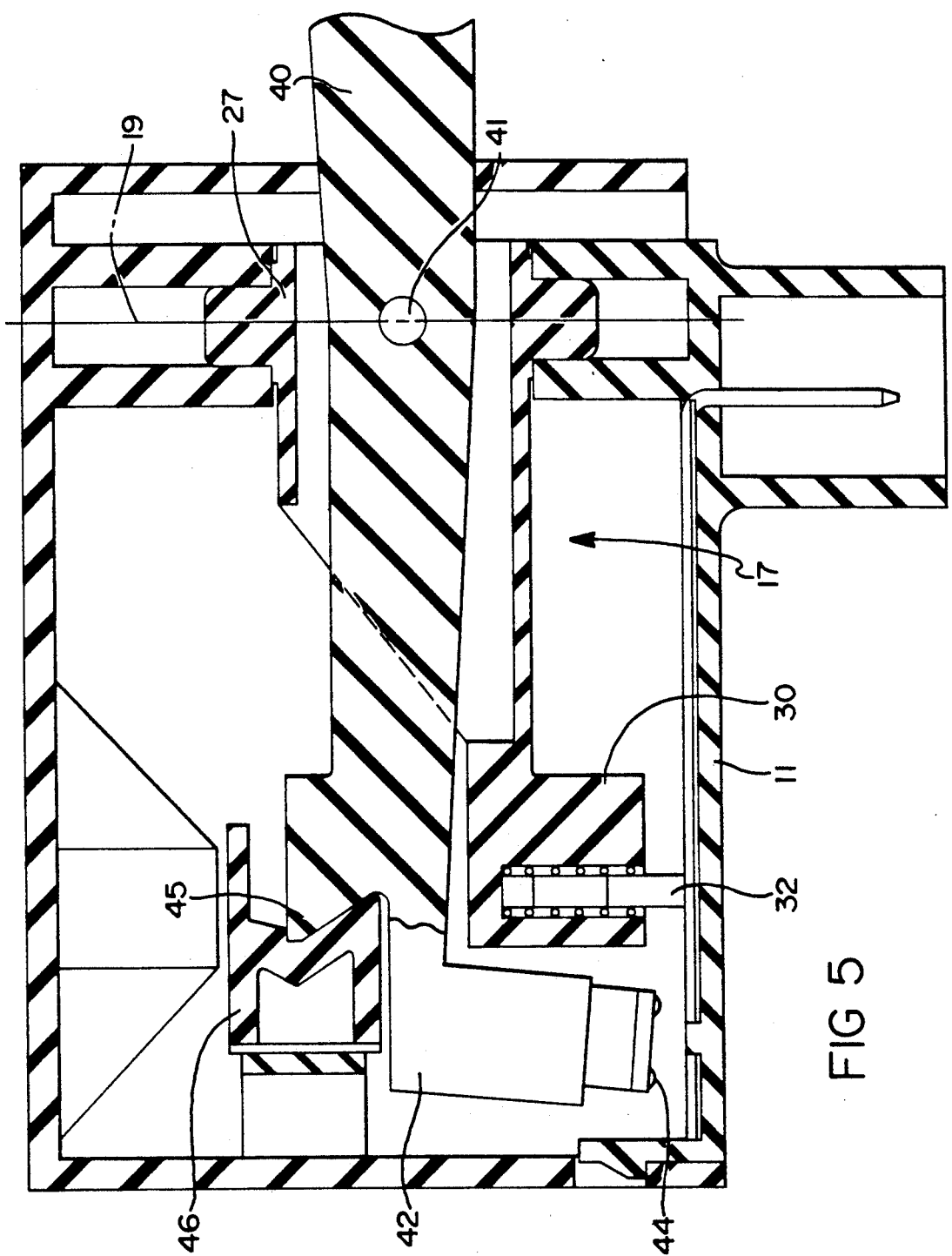
FIG. 5 is the second embodiment shown in a section of the swiveling axis of the switching member.
Figure 6:
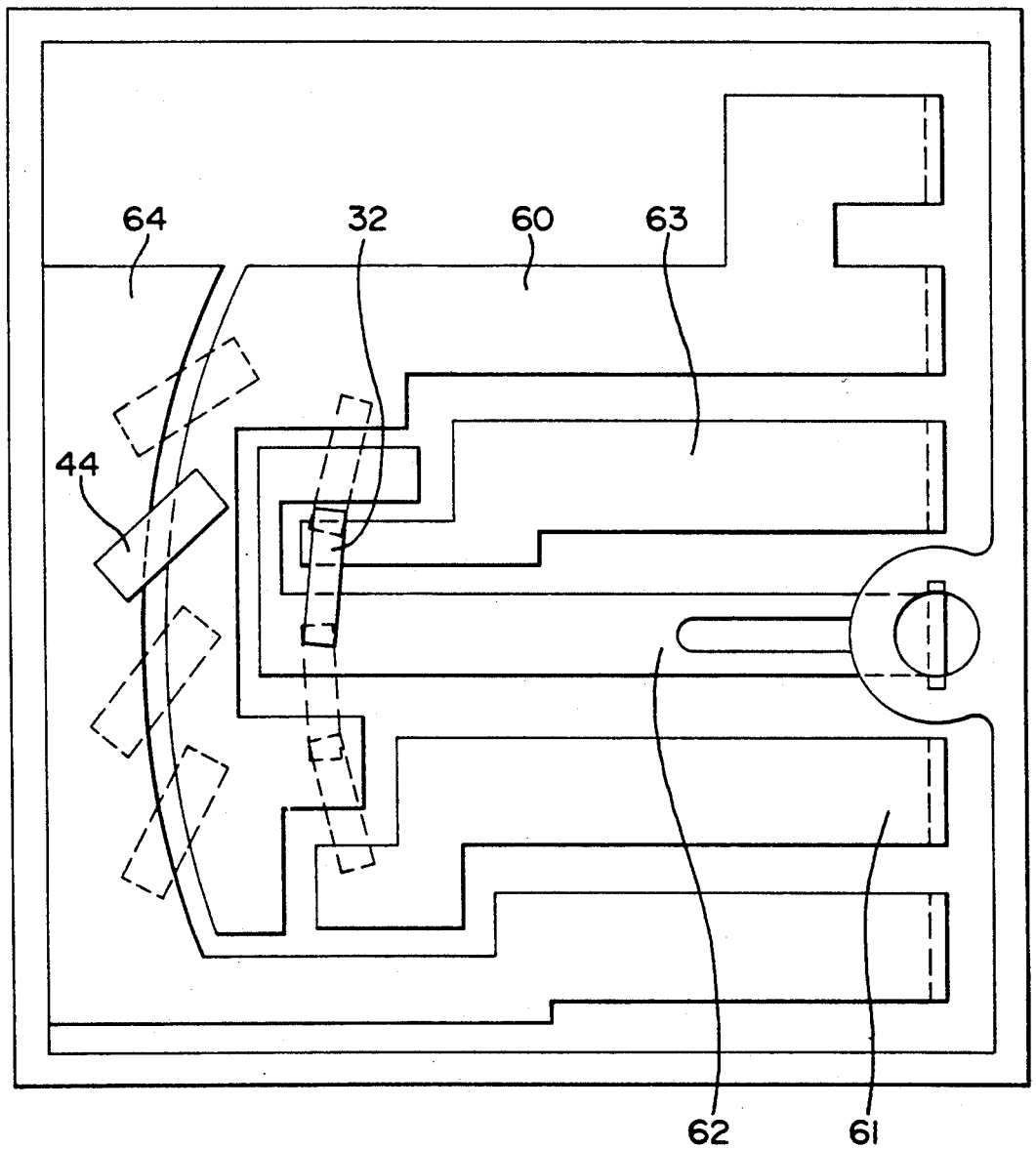
FIG. 6 is a view of the base plate of the second embodiment with positions of the two movable contacts again indicated.

The electric switch according to the FIGS. 5 and 6 is constructed in a similar way as that according to the FIGS. 1 to 4. The switch lever 40, is supported by a cam 45 on a locking lever 46. The switching member 17 again has a frame-like section 27, by which it is swivellably mounted around an axis 19, and a plate-like section 30, on which a second bridging contact 32 is guided. This bridging contact lies on the base plate 11. The switch lever 40 again comprises an extension 42 for hanging a first bridging contact 44. Thereby, however, this extension is not located laterally to the plate-like section 30 of the switching member 17, but, viewed in the radial direction to the axis 19, is positioned beyond the plate-like section 30 of the switching member 17.

The second bridging contact 32 is arranged in such a way that in its longitudinal direction it extends in the swiveling direction of the switching member 17. The position of the first bridging contact 44 is sloping; it is between a radial direction with respect to the axis 19 and the swiveling direction of the switching member 17. In the neutral position of the switching member 17 and of the switch lever 40 with respect to the axis 19, the second bridging contact 32 again connects the two stationary contacts 62 and 63. This position of the second bridging contact 32 is illustrated in FIG. 6 in continual lines. The other switching positions of the switching member 17 correspond to the switching positions of the embodiment according to the FIGS. 1 to 4. Corresponding stationary contacts of the second bridging contact 32 are connected with each other. When swiveling the switch lever 40 counter-clockwise —according to FIG. 5—, the bridging contact 44 acts upon the stationary contacts 60 and 64 regardless of the position of the switch lever 40 with respect to the axis 19.

What is claimed is:

1. An electric switch comprising:
   a switch housing assembly having two stationary contacts;
   a switching member mounted in said switch housing for rotation about a first axis;
   a switch lever mounted on said switching member for rotation about a second axis angular offset from said first axis; and
   a first bridging contact carried by said switch lever for alternatively bridging said two stationary contacts depending upon the angular position of said switch lever about said second axis, said first bridging contact bridging said two stationary contacts at different points as a function of angular position of said switching member and said switch lever about said first axis so that said alternative bridging of said two stationary contacts by said first bridging contact is independent of said position of said switching member and said switch lever about said first axis.

2. A multi-function electric switch comprising:
   a switch housing assembly having a plurality of electrically isolated, stationary contacts;
   a switching member mounted in said switch housing for rotation about a first axis into switching positions interconnecting separate pairs of said plurality of stationary contacts;
   a switch lever mounted on said switching member for rotation about a second axis angularly offset from said first axis; and
   a first bridging contact carried by said switch lever for alternatively bridging one pair of said plurality of stationary contacts depending upon the angular position of said switch lever about said second axis, said first bridging contact bridging said one pair of stationary contacts at different points as a function of angular position of said switching member and said switch lever about said first axis so that said alternative bridging of said one pair of stationary contacts by said first bridging contact is independent of said position of said switching member and said switch lever about said first axis.

3. An electric switch for operating a windshield wiper and washer system for a motor vehicle comprising:
   a switch housing assembly having a plurality of electrically isolated, stationary contacts;
   a switching member mounted in said switch housing for rotation about a first axis into switch positions interconnecting separate pairs of said plurality of stationary contacts and corresponding to operational stages of said windshield wiper system;
   a switch lever mounted on said switching member for rotation about a second axis angularly offset from said first axis; and
   a first bridging contact carried by said switch lever for alternatively bridging one pair of said plurality of stationary contacts depending upon the angular position of said switch lever about said second axis, said first bridging contact bridging said one pair of stationary contacts, thereby activating said washer system, at different points as a function of the angular position of said switching member and said switch lever about said first axis so that said alternative bridging of said one pair of said stationary contacts by said first bridging contact is independent of said position of said switching member and said switch lever about said first axis.

4. An electric switch as claimed in claim 3 wherein said switch housing has a side wall and said second bridging contact extends in its longitudinal direction substantially parallel to said side wall when said switching member is in its outwardmost switching position.

5. An electric switch as claimed in claim 3 further comprising a second bridging contact carried by said switching member for interconnecting separate pairs of said plurality of stationary contacts, wherein said first bridging contact and said second bridging contact are positioned one after another when viewed in the radial direction of said first axis, said radial direction being substantially perpendicular to said second axis.

6. An electric switch as claimed in claim 5 wherein said plurality of stationary contacts interconnected by said second bridging contact carried by said switching member are positioned one after another on said switch housing in the direction of rotation of said switching member.

7. An electric switch as claimed in claim 5 wherein the two stationary contacts of said one pair of said plurality of stationary contacts bridged by said first bridging contact are positioned one after another on said switch housing in a direction radial to said first axis.

8. An electric switch as claimed in claim 3 further comprising a second bridging contact carried by said switching member for interconnecting separate pairs of said plurality of stationary contacts, wherein said first bridging contact and said second bridging contact are substantially equidistant from said first axis and are located one after another in the direction of rotation of said switching member about said first axis.

9. An electric switch as claimed in claim 8 wherein said second bridging contact extends radially to said first axis in its longitudinal direction.

10. An electric switch as claimed in claim 8 wherein said switching member has a frame-like section, through which said switch lever passes and in which said switch lever is mounted, and a plate-like section protruding from said frame-like section and carrying said second bridging contact.

11. An electric switch as claimed in claim 10 wherein said first bridging contact carried by said switch lever is positioned outside said plate-like section of said switching member.

12. An electric switch as claimed in claim 10 wherein said frame-like section of said switching member has a side from which said plate-like section protrudes and said plate-like section is smaller than said side of said frame-like section.

13. An electric switches claimed in claim 10 wherein said frame-like section of said switching member is longer, when viewed in the direction of said second axis, from said first axis toward said first bridging contact than from said first axis away from said first bridging contact.

* * * * *